(12) United States Patent
Chung et al.

(10) Patent No.: US 8,287,196 B2
(45) Date of Patent: Oct. 16, 2012

(54) FOCAL PLANE SHUTTER AND CAMERA HAVING THE SAME

(75) Inventors: Hae-In Chung, Uijeongbu-si (KR); Jin-Won Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/969,227

(22) Filed: Dec. 15, 2010

(65) Prior Publication Data
US 2011/0150457 A1  Jun. 23, 2011

(30) Foreign Application Priority Data
Dec. 18, 2009 (KR) .................. 10-2009-0126846

(51) Int. Cl.
*G03B 9/08* (2006.01)
(52) U.S. Cl. ........................ 396/456; 348/363
(58) Field of Classification Search .............. 396/456; 348/363
See application file for complete search history.

(56) References Cited

U.S. PATENT DOCUMENTS 6,726,379 B2 * 4/2004 Watabe et al. ............. 396/456
2002/0172519 A1 * 11/2002 Takahashi et al. .......... 396/486

FOREIGN PATENT DOCUMENTS

KR  20-0170158  3/2000

* cited by examiner

*Primary Examiner* — Rodney Fuller
*Assistant Examiner* — Fang-Chi Chang
(74) *Attorney, Agent, or Firm* — The Farrell Law Firm, P.C.

(57) ABSTRACT

A focal plane shutter having a front film and a back film which expose a charge-coupled device to light as they move back and forth between a cover plate and a base plate, between a charging position and a discharging position at a certain time interval. The focal plane shutter includes at least one lever member which is connected to the front film and/or back film, and which amplifies an impact force generated during a charging and a discharging movement of the front film and/or back film using a lever action. An elevating member slides in a direction parallel with the movement of the front film and/or back film by the impact force amplified in the lever member. An impact absorbing unit regulates the sliding movement of the elevating member to absorb impact energy generated by the movement and stop of the front film and/or back film.

15 Claims, 8 Drawing Sheets

FOCAL PLANE SHUTTER AND CAMERA HAVING THE SAME

CROSS-REFERENCE TO RELATED APPLICATION

This application claims priority from Korean Patent Application No. 10-2009-126846, filed in the Korean Intellectual Property Office on Dec. 18, 2009, the disclosure of which is incorporated herein by reference in its entirety.

TECHNICAL FIELD

The present disclosure generally relates to an image taking apparatus, and more particularly to a focal plane shutter having a vibration reduction unit capable of absorbing the impact generated as the shutter opens and closes.

BACKGROUND OF RELATED ART

In general, various types of shutter units are installed in electronic image taking apparatuses to enable adequate exposure to light. A focal plane shutter is driven as two thin films or metal films which are installed right before the focal plane move left and right or up and down. The focal plane shutter controls the movement of the front film and the back film, so as to regulate the size of a slit formed between the front film and the back film. By regulating the size of the slit as above, it is possible to expose a photosensitive member, such as a charge-coupled device, to an adequate amount of light. This type of focal plane shutter is frequently used in cameras where lens are replaceable. Focal plane shutters are generally installed in cameras having charge-coupled devices sized 6×6 cm or less. In addition, the exposure time is determined only by adjusting the width of the slit using an electromagnet which is electronically controlled and by controlling the movement of the front film and the back film to maintain a certain speed. The merits of cameras having this type of focal plane shutters are that the lens is replaceable and that the shutter may move at a very high speed. However, the problems of such cameras are that the size of such a focal plane shutter is rather big compared to a lens shutter device and that too much vibration and noise can be generated by the movement of the front film and the back film.

In the past, in order to resolve such problems of vibration and noise, a latch structure was applied to absorb the impact which is generated during shutter movement, and buffering devices were used to reduce the bounce and impact.

However, although the latch structure can reduce the bounce, it cannot absorb the impact. Thus, the components of the camera would absorb the impact, deteriorating the components after long-term use.

Furthermore, since a bounce reduction device delivers an impact to a spring connected to the buffering device, it may reduce the impact sent to the components of the camera, but it may also cause a second bounce due to the restoration of the spring, increasing the shutter stabilization time and deteriorating the connectivity.

SUMMARY OF THE INVENTION

A focal plane shutter according to an exemplary embodiment of the present disclosure has a front film and a back film which expose a charge-coupled device to light as they move back and forth between a cover plate and a base plate, between a charging position and a discharging position at a certain time interval. The focal plane shutter includes at least one lever member which is connected to the front film and/or the back film, and which amplifies an impact force generated during a charging and a discharging movement of the front film and/or the back film using a lever action. An elevating member slides in a direction parallel with the movement of the front film and/or the back film by the impact force amplified in the lever member. An impact absorbing unit regulates the sliding movement of the elevating member to absorb the impact energy generated by the movement and stop the front film and/or the back film.

According to an exemplary embodiment of the present disclosure, an image taking apparatus may include a lens unit; a charge-coupled device which converts an image of a subject which passes through the lens unit into electric signals; and a focal plane shutter according to the above, which is installed between the lens unit and the charge-coupled device, and regulates a light exposure time of the charge-coupled device.

BRIEF DESCRIPTION OF THE DRAWINGS

The above and/or other aspects of the present disclosure will be more apparent by describing certain present disclosure with reference to the accompanying drawings, in which.

DETAILED DESCRIPTION OF THE PREFERRED EMBODIMENTS

Certain exemplary embodiments are described in greater detail with reference to the accompanying drawings.

Figure 1:
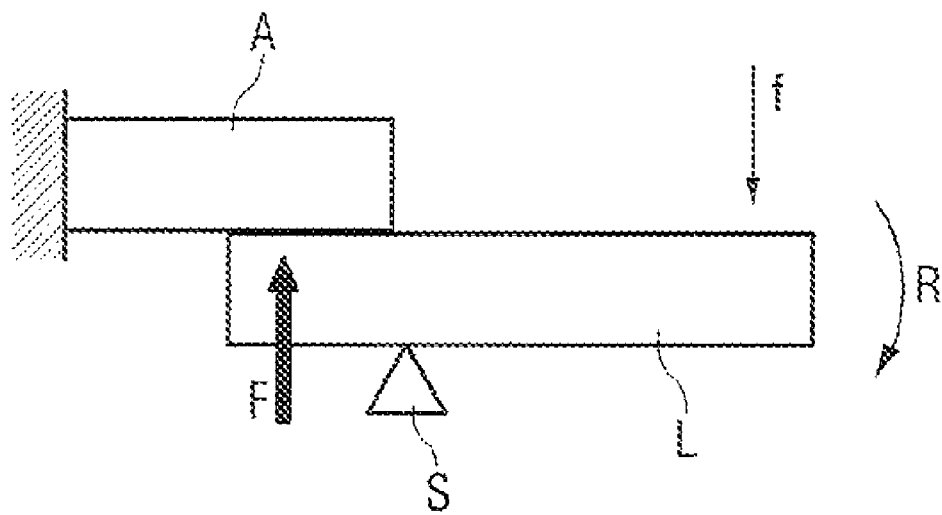
FIGS. 1 and 2 are conceptual views explaining the principle of an impact absorbing unit of a focal plane shutter according to the present disclosure.

FIG. 1 is a conceptual view illustrating the operating principle of a vibration reduction device provided in a focal plane shutter according to the present disclosure.

As illustrated, in a lever member L which rotates in a direction R having a supporting point S as a fulcrum, a rotating force f which is applied to one end is amplified into a greater force F in the opposite side of point S by a lever action. Herein, if there is provided an elastic member A having a relatively greater stiffness as compared to the lever member L on an upper side of the lever member L, the elastic member A may absorb a rotation moment according to the rotating force f through an elastic transformation.

Figure 2:
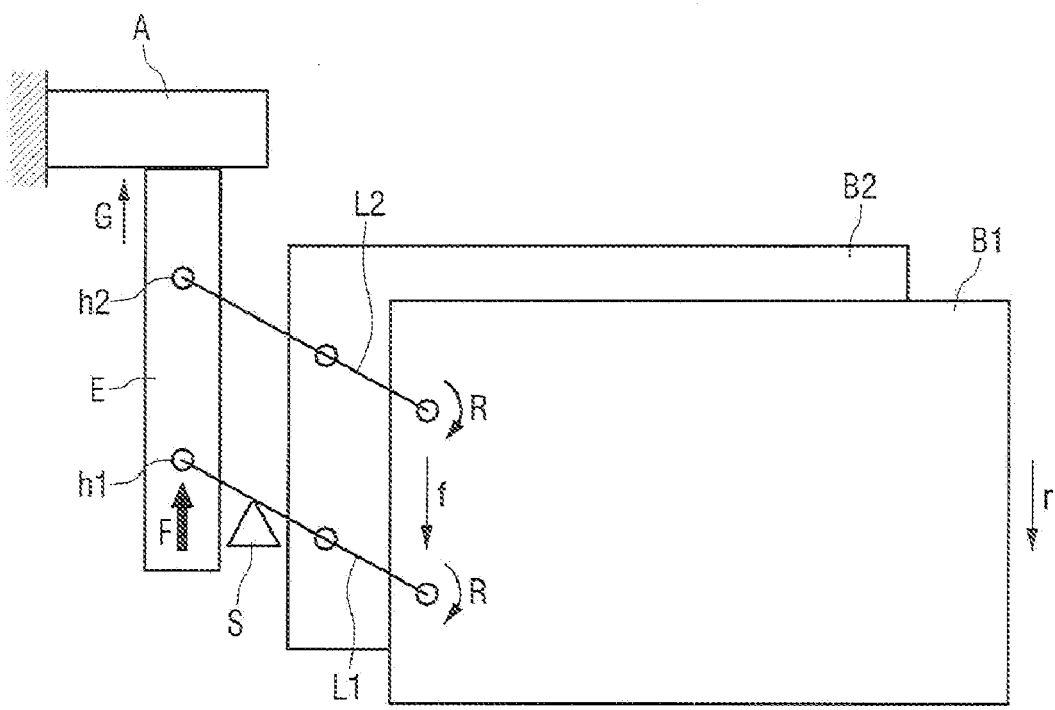

FIG. 2 is a conceptual view of a vibration reduction structure of the focal plane shutter configured in line with the conceptual view of FIG. 1. Herein, the structure is configured to absorb the moment generated by the rotating force of the rotation of the lever member and an inertia using the lever action.

That is, a first shutter blade B1 and a second shutter blade B2 are rotatably linked to a first lever member L1 and a second lever member L2, and the first lever member L1 and the second lever member L2 are rotatably linked to an elevating member E. When the first shutter blade B1 and the second shutter blade B2 move in a direction r, the first lever member L1 and the second lever member L2 rotate around hinge points h1, h2 towards a direction R. During this process, when the first lever member L1 touches the supporting point S and is interrupted, the supporting point S becomes a new center for rotation, and as a force F amplified by the lever action is applied to the hinge points h1, h2, the elevating member E is raised towards a direction of arrow G as illustrated in FIG. 2.

Then, the elastic member A, which regulates the movement of the elevating member E, elastically transforms to absorb the moment generated by the inertia due to the movement of the first shutter blade B1 and the second shutter blade B2. Of course, it is possible to provide the supporting point S in the second lever member L2, or in both the first lever member L1 and the second lever member L2.

Figure 3:
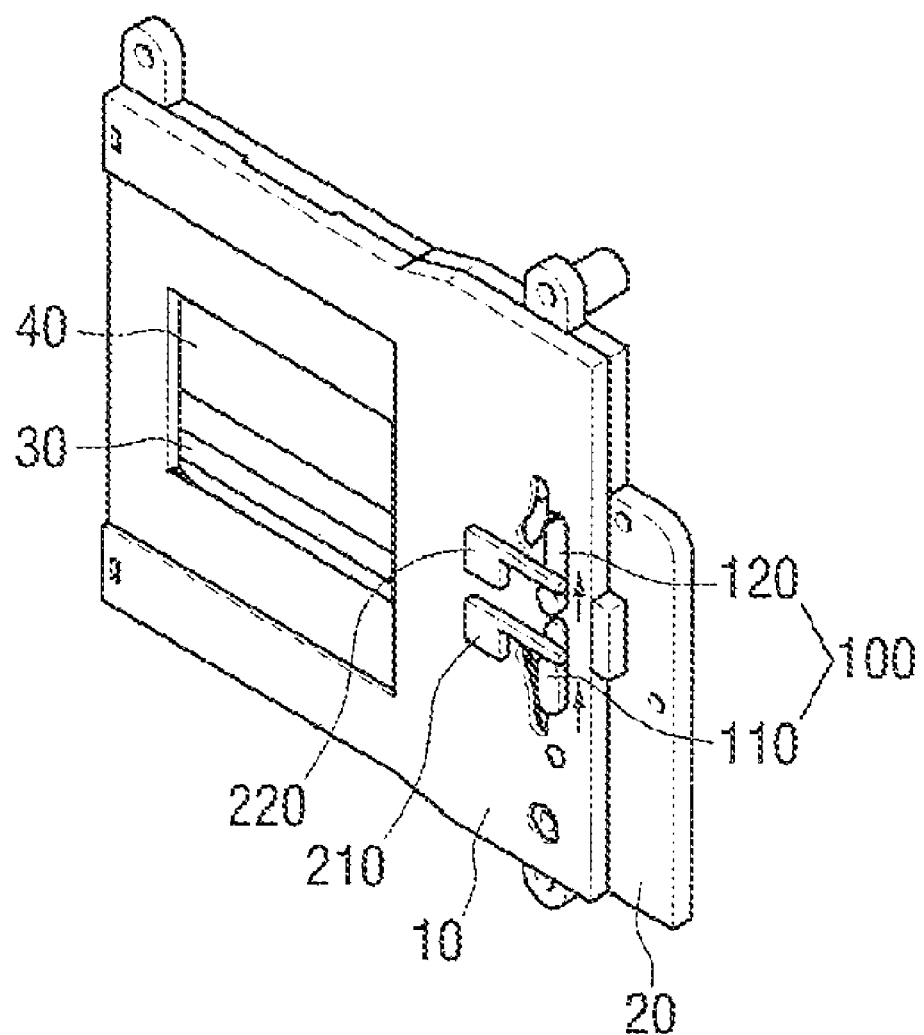
FIG. 3 is a perspective view of the focal plane shutter according to an exemplary embodiment of the present disclosure.
Figure 4:
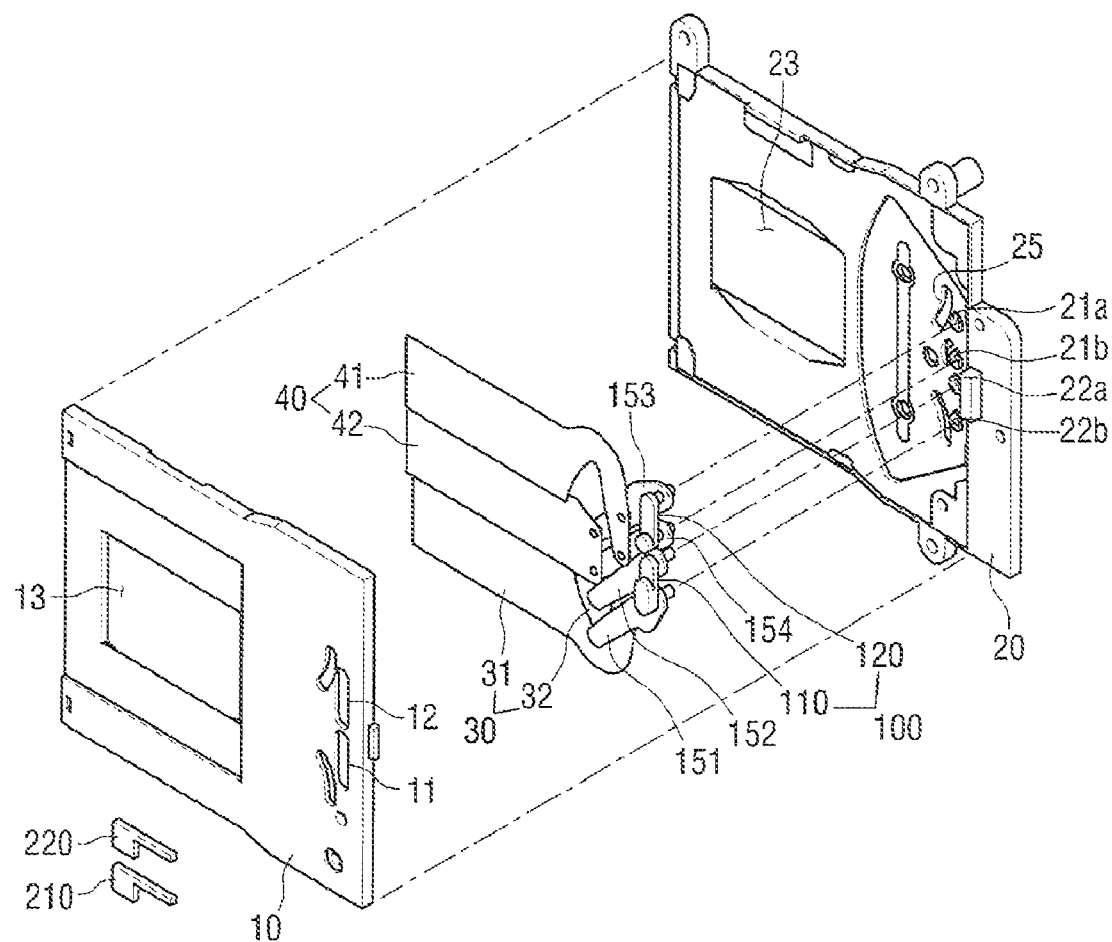
FIGS. 4 and 5 are exploded perspective views of FIG. 3.
Figure 5:
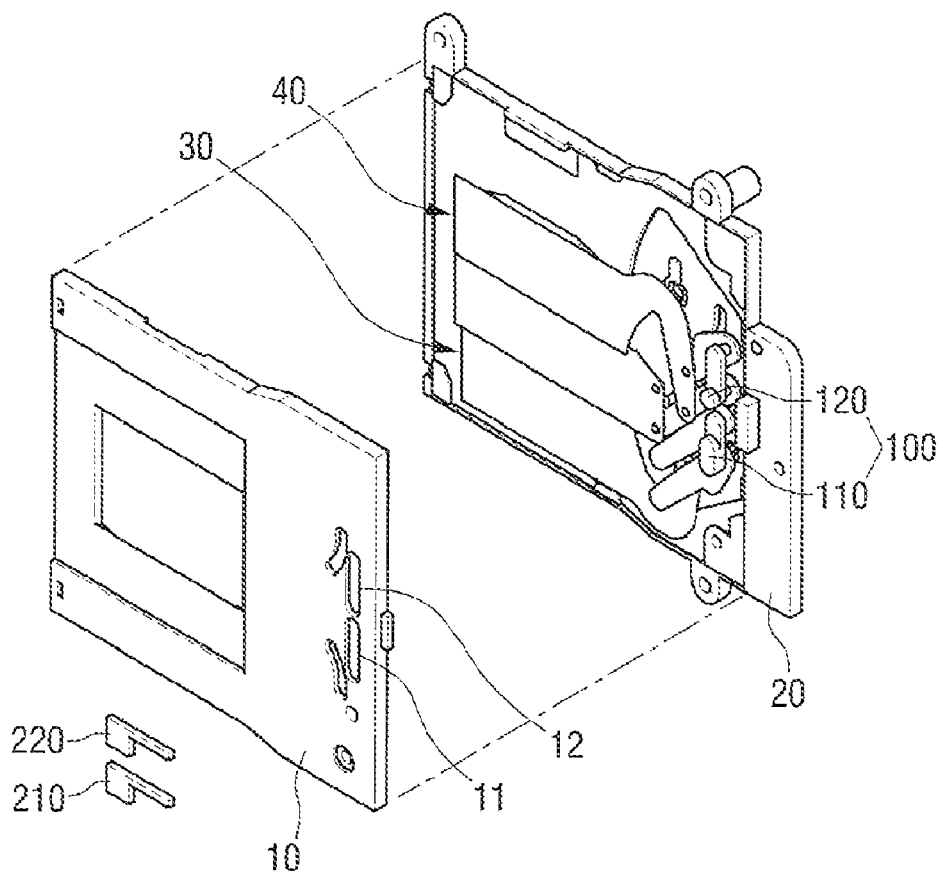

FIG. 3 is the perspective view illustrating the structure of the focal plane shutter according to an exemplary embodiment of the present disclosure, and FIGS. 4 and 5 are exploded perspective views of FIG. 3.

The focal plane shutter according to the present invention comprises a cover plate 10, a base plate 20, a front film 30, a back film 40, an elevating member 100, and an impact absorbing unit 200.

The cover plate 10 comprises a first slit 11 and a second slit 12 which guide a first elevating member 110 and a second elevating member 120, respectively; and a first through hole 13 formed in a position corresponding to a charge-coupled device (not illustrated). The cover plate 10 forms a front surface of the focal plane shutter, and faces lens unit (not illustrated).

The front film 30 and the back film 40 are assembled on the based plate 20 which combines with the cover plate 10 to control the position of the front film 30 and the back film 40. The base plate 20 has a third to sixth slits 21a, 21b, 22a, 22b so that it can couple with the elevating member 100, and also has a second through hole 23 on a surface facing the first through hole 13 so as to expose the charge-coupled device (not illustrated).

The elevating member 100 is connected to the front film 30 and the back film 40, and is also installed in such a manner that it can slide in a direction parallel with the moving direction of the front film 30 and the back film 40 by the impact force generated during the movement of the front film 30 and the back film 40. The elevating member 100 consists of a first elevating member 110 which is connected to the front film 30 and a second elevating member 120 which is connected to the back film 40.

Figure 6:
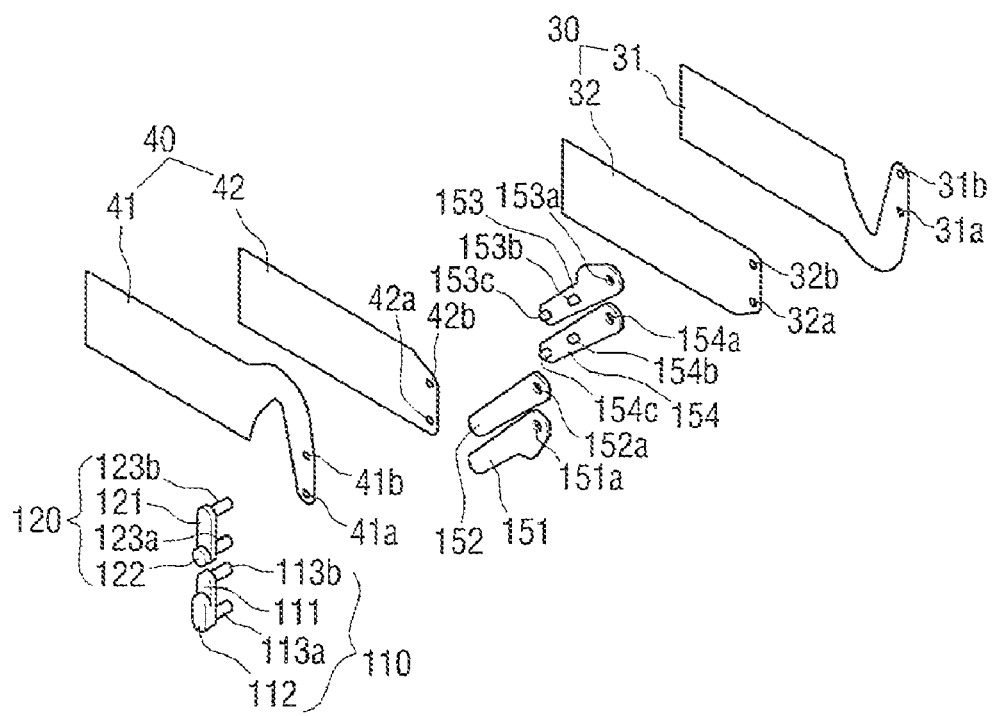
FIG. 6 is an exploded perspective view illustrating a connection relationship between a front film and a back film according to an exemplary embodiment of the present disclosure.

The connection relationships between the front film 30 and the first elevating member 110 and between the back film 40 and the second elevating member 120, and the configuration of the impact absorbing unit 200 will be explained in greater detail with reference to FIGS. 6 and 7.

The front film 30 comprises a first shutter blade 31 and a second shutter blade 32 having sizes capable of closing both the first through hole 13 and the second through hole 23. The first shutter blade 31 and the second shutter blade 32 are rotatably linked to the first elevating member 110 by a first lever member 151 and a second lever member 152. The first lever member 151 and the second lever member 152 comprise first pivot points 151a, 152a which are connected to the first elevating member 110, second pivot points 151b, 152b which are connected to the first shutter blade 31, and third pivot points 151c, 152c which are connected to the second shutter blade 32.

The first elevating member 110 comprises a first elevating member body 111, a first sliding protrusion 112 which is positioned in the first slit 11, and a plurality of first connecting protrusions 113a, 113b which are connected to the first lever member 151 and the second lever member 152. The first connecting protrusions 113a, 113b protrude on the opposite side of body 111 from the first sliding protrusion 112, and each of the first connecting protrusions 113a, 113b is connected to each of the first pivot points 151a, 152a.

The back film 40 comprises a third shutter blade 41 and a fourth shutter blade 42 having sizes capable of closing both the first through hole 13 and the second through hole 23. The third shutter blade 41 and the fourth shutter blade 42 are rotatably linked to the second elevating member 120 by a third level member 153 and a fourth lever member 154. The third lever member 153 and the fourth lever member 154 comprise fourth pivot points 153a, 154a connected to the second elevating member 120, fifth pivot points 153b, 154b connected to the third shutter blade 41, and sixth pivot points 153c, 154c connected to the fourth shutter blade 42.

The second elevating member 120 comprises a second elevating member body 121, a second sliding protrusion 122 which engages with the second slit 12, and a plurality of second connecting protrusions 123a, 123b which are connected to the third lever member 153 and the fourth lever member 154. The second connecting protrusions 123a, 123b protrude on the opposite side of body 121 from the second sliding protrusion 122, and each second connecting protrusions 123a, 123b is connected to each of the fourth pivot points 153a, 154a.

The first sliding protrusion 112 and the second sliding protrusion 122 provided in the first elevating member 110 and the second elevating member 120 may have the same size, but it is desirable that the first sliding protrusion 112, which is subject to a relatively bigger impact, be formed to have a larger size.

According to an exemplary embodiment of the present disclosure, it is desirable that the first pivot points 151a, 152a and the fourth pivot points 153a, 154a are provided as holes in which the first connecting protrusions 113a, 113b with the second connecting protrusions 123a, 123b, respectively are rotatably coupled; and it is desirable that the second pivot points 151b, 152b and the third pivot points 151c, 152c formed in the first lever member 151 and the second lever member 152 have shapes of protrusions which protrude in the opposite direction to the fifth pivot points 153b, 154b and the sixth pivot points 153c, 154c formed in the third lever member 153 and the fourth lever member 154. However, such a configuration is only an exemplary embodiment, and thus as long as the connecting parts are rotatable pivot points, any combination is possible.

The impact absorbing unit 200 regulates the sliding movement of the elevating member 100 and absorbs the impact energy generated by the moving or stop movement of the front film 30 and the back film 40.

The impact absorbing unit 200 comprises a first elastic member 210, a second elastic member 220, and a first supporting portion 201 and a second supporting portion 202. The first elastic member 210 and the second elastic member 220 elastically transform in connection with the rising movement of the first elevating member 110 and the second elevating member 120, just as the elastic member A illustrated in FIGS. 1 and 2. That is, as illustrated in FIG. 3, the first sliding protrusion 112(see FIG. 6) which protrudes from the first elevating member 110 is slidably positioned in the first slit 11 and contacts the first elastic member 210, and the second sliding protrusion 122(see FIG. 6) which protrudes from the second elevating member 120 is slidably positioned in the second slit 12 and contacts the second elastic member 220. Therefore, since the first elastic member 210 and the second elastic member 220 always press the first sliding protrusion 112 and the second sliding protrusion 122, when the first elevating member 110 and the second elevating member 120 are driven to move along the first slit 11 and the second slit 12, the first elastic member 210 and the second elastic member 220 elastically transform according to that force, and the first elevating member 110 and the second elevating member 120 are urged towards the initial position.

Figure 7:
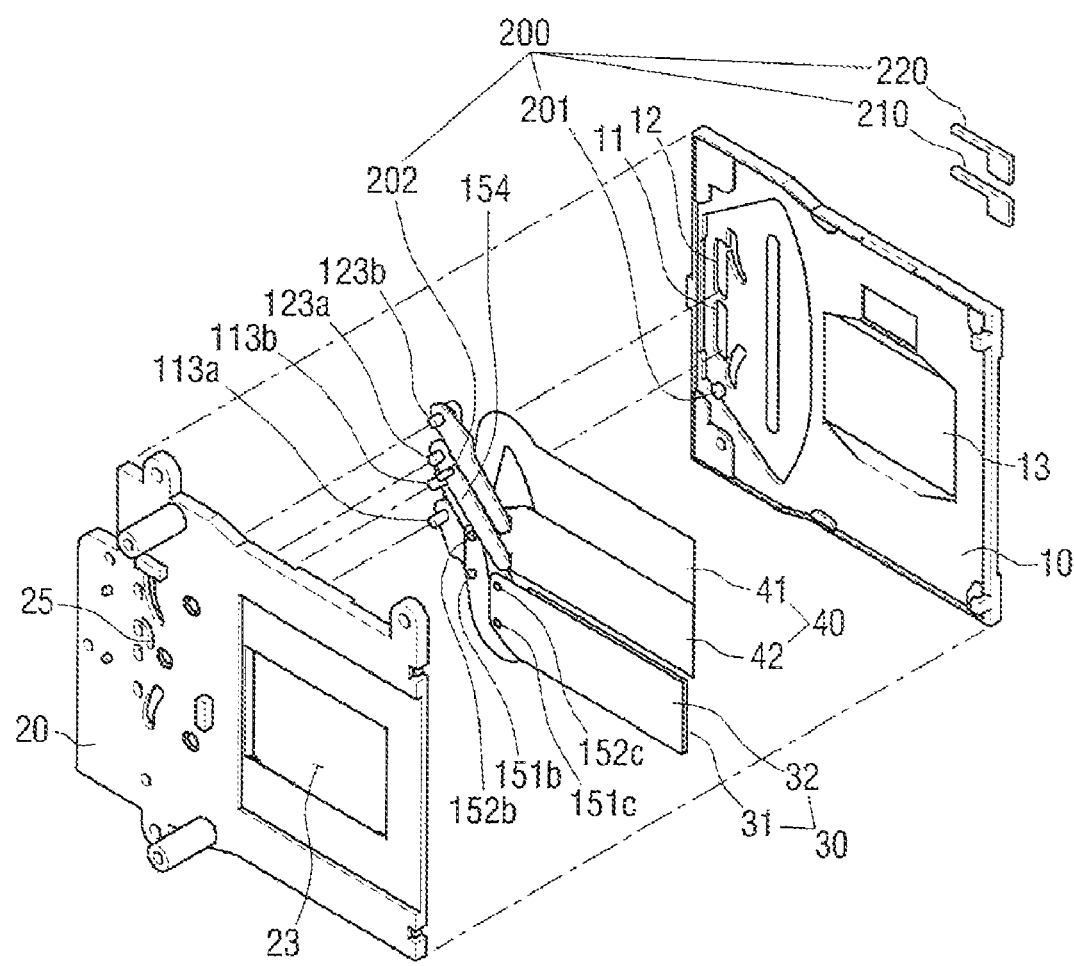
FIG. 7 is an exploded perspective view seen from the opposite side of FIGS. 3.

As illustrated in FIG. 7, the first supporting portion 201 protrudes from an inner surface of the cover plate 10, to make the first pivot points 151a of the first lever member 151 rise during a charging movement of the front film 30.

As illustrated in FIG. 7, the second supporting portion 202 protrudes from the fourth lever member 154, so that it can move along a sliding slot 25 formed in the base plate 20. The second supporting portion 202 makes the fourth pivot point 153a of the third lever member 153 rise during a charging movement of the back film 40.

The first supporting portion 201 and the second supporting portion 202 are disposed as close as possible to the first pivot point 151a and the fourth pivot point 153a, and the lever action is amplified as much as possible so that the elastic transformation of the first elastic member 210 and the second elastic member 220 occurs more easily.

A movement of the focal plane shutter of the present disclosure is explained hereinbelow.

When a shutter movement signal is applied during photographing a still image, the front film 30 and the back film 40 which are closing the first through hole 13 and the second through hole 23 move from a discharging position to a discharging position at a certain interval; but when photographing a moving image, the front film 30 and the back film 40 move towards a position of opening the first through hole and the second through hole 23 so as to completely open the charge-coupled device. During the above movements, an impact is generated when movement of shutter blades 31, 32, 41, and 42 are stopped due to inertia of each mass of the shutter blades 31, 32, 41, and 42. This impact is transferred to the first to fourth lever members 151 to 154 which open and close the front film 30 and the back film 40.

The first lever member 151 and third lever member 153 set the first pivot point 151a and the fourth pivot point 153a which are rotatably connected to the first elevating member 110 and the second elevating member 120 to be the rotating center of the front film 30 and the back film 40. The first supporting portion 201 and the second supporting portion 202, which are disposed to be close to the first pivot point 151a and the fourth pivot point 153a do not engage the first lever member 151 and the third lever member 153 in the discharging position of the front film 30 and the back film 40, but when the front film 30 and/or the back film 40 close or open to the movement position, the first supporting portion 201 engages with the first lever member 151, and the second supporting portion 202 engages with the third lever member 153, playing the same role as a supporting point of a lever.

The impact which is generated during the movement of the front film 30 and/or the back film 40 moves the first elevating member 110 and/or the second elevating member 120 in the direction of the arrow illustrated in FIG. 3 by the lever action. Usually the movement of the front film 30 and/or the back film 40 occurs instantly, and thus the impact generated by the movement is a small force, but when a lever action is used, it is possible to raise the first elevating unit 110 and the second elevating unit 120 with a relatively big force.

However, since the rising movement of the first elevating member 110 and the second elevating member 120 is regulated by the first elastic member 210 and the second elastic member 220, the impact is absorbed by the elastic transformation of the first elastic member 210 and the second elastic member 220, and thus vibration can be restrained from being generated in the front film 30 and/or the back film 40.

Figure 8:
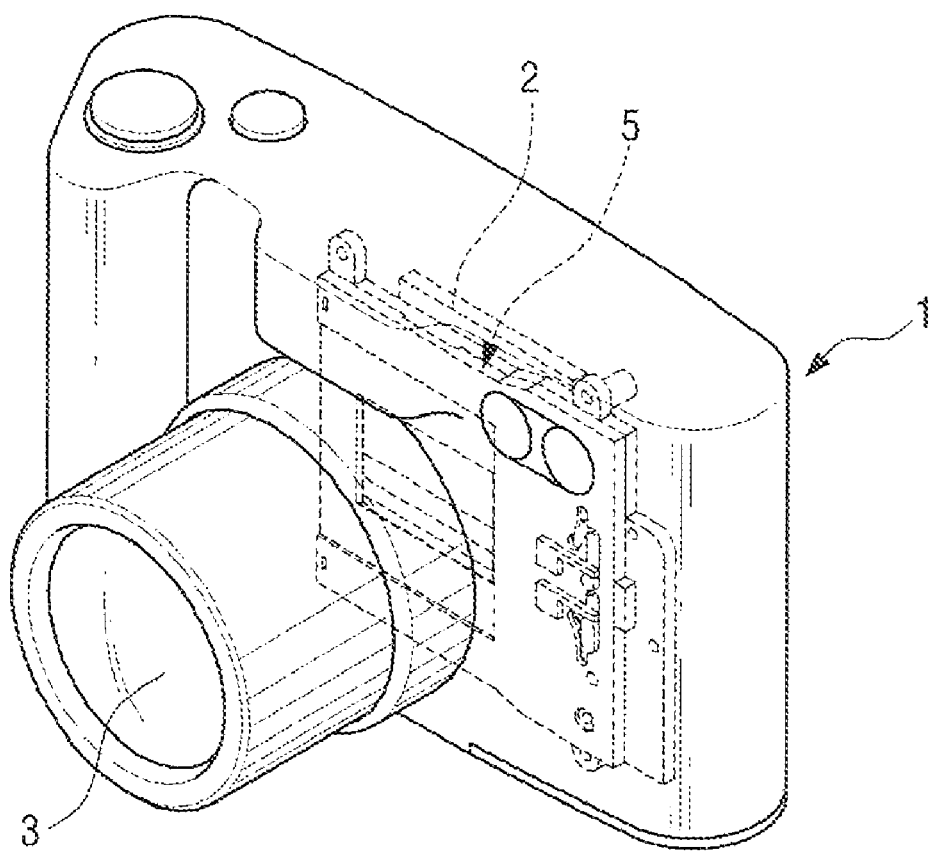
FIG. 8 is a perspective view illustrating schematically an example of an image taking apparatus.

The focal plane shutter 5 configured as above is disposed between the charge-coupled device 2 and the lens unit 3 in the image taking apparatus 1 (see FIG. 8). More detailed configuration and movement of the image taking apparatus is omitted since they go beyond the main points of the present disclosure.

According to the above configuration, even a small impact generated during movements of the front film 30 and the back film 40 can be amplified by the lever action and can be absorbed, reducing the shutter stabilizing time and the bounce which can occur when absorbing the impact.

In addition, it is possible to constantly absorb the impact which is generated during the shutter movement, and thus the durability of the device can also be maintained.

Furthermore, if the first elastic member 210 and second elastic member 220 are made of a steel material having a larger stiffness than the first to fourth lever members 151 to 154 which are usually made of resins, the elastic members can play the role of absorbing the impact and the stabilizing time can also be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A focal plane shutter having a front film and a back film which expose a charge-coupled device to light as they move back and forth between a cover plate and a base plate, between a charging position and a discharging position at a certain time interval, the focal plane shutter comprising:
    at least one lever member which is connected to the front film and/or the back film, and which amplifies an impact force generated during a charging and a discharging movement of the front film and/or the back film using a lever action;
    an elevating member which slides in a direction parallel with the movement of the front film and/or the back film by the impact force amplified in the lever member; and
    an impact absorbing unit which constantly pressured the elevating member to regulate the sliding movement of the elevating member to absorb the impact energy generated by the movement and stop the front film and/or the back film.

2. The focal plane shutter according to claim 1, wherein the elevating member comprises:
    a first elevating member which is connected to the front film; and
    a second elevating member which is connected to the back film.

3. The focal plane shutter according to claim 2, wherein the first elevating member comprises:
    a first elevating member body;
    a first sliding protrusion which protrudes from one surface of the first elevating member body, and engages with a first slit formed in the cover plate; and
    a first connecting protrusion which protrudes from another surface of the first elevating member body, and is coupled through the at least one lever member to the front film.

4. The focal plane shutter according to claim 3, wherein the second elevating member comprises:

a second elevating member body;

a second sliding protrusion which protrudes from one surface of the second elevating member body, and engages with a second slit formed in the cover plate; and a second connecting protrusion which protrudes from another surface of the second elevating member body, and is coupled through another lever member to the front film.

5. The focal plane shutter according to claim 4, wherein the first sliding protrusion is bigger than the second sliding protrusion.

6. The focal plane shutter according to claim 5, wherein the first connecting protrusion and the second connecting protrusion engage with the base plate.

7. The focal plane shutter according to claim 6, wherein the at least one lever member comprises:

a first lever member and a second lever member which connect the first elevating member and the front film; and a third lever member and a fourth lever member which connect the second elevating member and the back film.

8. The focal plane shutter according to claim 7, wherein the front film comprises a first shutter blade and a second shutter blade, and the back film comprises a third shutter blade and a fourth shutter blade.

9. The focal plane shutter according to claim 8, wherein the first lever member and the second lever member each comprise:

a first pivot point which is connected to the first elevating member;

a second pivot point which is connected to the first shutter blade; and a third pivot point which is connected to the second shutter blade.

10. The focal plane shutter according to claim 8, wherein the third lever member and the fourth lever member each comprise:

a fourth pivot point which is connected to the second elevating member;

a fifth pivot point which is connected to the third shutter blade; and a sixth pivot point which is connected to the fourth shutter blade.

11. The focal plane shutter according to claim 10, wherein the impact absorbing unit comprises:

a first elastic member which contacts the first sliding protrusion, and regulates the sliding movement of the first elevating member;

a second elastic member which contacts the second sliding protrusion, and regulates the sliding movement of the second elevating member; and a first supporting portion and a second supporting portion which support the first lever member and the third lever member, and amplify the impact generated in the first lever member and the third lever member.

12. The focal plane shutter according to claim 11, wherein the first supporting portion protrudes from an inner surface of the cover plate, and the second supporting portion protrudes from a surface facing the base plate of the fourth lever member.

13. The focal plane shutter according to claim 12, wherein the first supporting portion and the second supporting portion are disposed to be close to the first pivot point and the fourth pivot point.

14. The focal plane shutter according to claim 13, wherein the second supporting portion slides in a slot formed in the base plate.

15. An image taking apparatus comprising:

a lens unit;

a charge-coupled device which converts an image of a subject which passes through the lens unit into electric signals; and a focal plane shutter according to any one of claim 1 to claim 14, which is installed between the lens unit and the charge-coupled device, and regulates a light exposure time of the charge-coupled device

* * * * *